United States Patent [19]
Berson et al.

[11] Patent Number: 6,039,257
[45] Date of Patent: Mar. 21, 2000

[54] POSTAGE METERING SYSTEM THAT UTILIZES SECURE INVISIBLE BAR CODES FOR POSTAL VERIFICATION

[75] Inventors: William Berson, Weston; Judith D. Auslander, Westport, both of Conn.

[73] Assignee: Pitney Bowes Inc., Stamford, Conn.

[21] Appl. No.: 08/847,807

[22] Filed: Apr. 28, 1997

[51] Int. Cl.[7] ................................................. G06K 7/10
[52] U.S. Cl. ........................ 235/468; 235/375; 235/470
[58] Field of Search .................................. 235/468, 462, 235/452, 453, 451, 462.01, 462.07, 470, 375

[56] References Cited

U.S. PATENT DOCUMENTS

| | | | |
|---|---|---|---|
| 4,168,533 | 9/1979 | Schwartz | 364/900 |
| 4,757,537 | 7/1988 | Edelmann et al. | 380/51 |
| 4,796,193 | 1/1989 | Pitchenik | 235/375 |
| 4,802,218 | 1/1989 | Wright et al. | 380/23 |
| 4,812,994 | 3/1989 | Taylor et al. | 364/464.02 |
| 4,864,618 | 9/1989 | Wright et al. | 380/51 |
| 4,900,903 | 2/1990 | Wright et al. | 235/380 |
| 4,900,904 | 2/1990 | Wright et al. | 235/381 |
| 4,952,785 | 8/1990 | Kikuda | 235/432 |
| 4,958,291 | 9/1990 | Mamone et al. | 235/379 |
| 5,229,587 | 7/1993 | Kimura et al. | 235/432 |
| 5,319,562 | 6/1994 | Whitehouse | 364/464.03 |
| 5,542,971 | 8/1996 | Auslander et al. | 106/21 A |
| 5,552,991 | 9/1996 | Lee et al. | 364/464.02 |
| 5,586,036 | 12/1996 | Pintsov | 380/51 |
| 5,675,650 | 10/1997 | Cordery et al. | 380/23 |

*Primary Examiner*—Donald Hajec
*Assistant Examiner*—Daniel St. Cyr
*Attorney, Agent, or Firm*—Ronald Reichman; Michael E. Melton

[57] ABSTRACT

A system that scans and reads IBI in accordance with the United State Postal Service Specification. This invention also improves both the readability and security of the Information-Based Indicia. The apparatus of this invention utilizes a postage meter that prints an Information-Based Indicia, scans and checks the Information-Based Indicia and prints an invisible, secure message, i.e., bar code over the Information-Based Indicia. The apparatus may also audit the franking process by immediately scanning and verifying the bar code that was printed over the Information Based-Indicia.

9 Claims, 3 Drawing Sheets

POSTAGE METERING SYSTEM THAT UTILIZES SECURE INVISIBLE BAR CODES FOR POSTAL VERIFICATION

CROSS REFERENCE TO RELATED APPLICATIONS

Reference is made to commonly assigned copending patent application Docket No. E-590 filed herewith entitled "A Postage Metering Refill System That Utilizes Information Contained In Information Based Indicia To Audit The Franking Process" in the name of William Berson.

FIELD OF THE INVENTION

The invention relates generally to the field of franking machines and more particularly to the scanning and verification of indicia produced by franking machines.

BACKGROUND OF THE INVENTION

Historically postage meters have been mechanical and electromechanical devices that: maintain through mechanical or "electronic registers" (postal security devices) an account of all postage printed and the remaining balance of prepaid postage; and print postage postmarks (indicia) that are accepted by the postal service as evidence of the prepayment of postage.

Soon small business mailers may be able to use their desktop computer and printer to apply postage directly onto envelopes or labels while applying an address. The United States Postal Service Engineering Center recently published a notice of proposed specification that may accomplish the foregoing. The title of the specification is Information Based Indicia Program Postal Security Device Specification, dated Jun. 13, 1996. The Information Based Indicia Program specification includes both proposed specifications for the new indicium and proposed specifications for a postal security device (PSD). The proposed Information-Based Indicia (IBI) consists of a two dimensional bar code containing hundreds of bytes of information about the mail piece and certain human-readable information. The indicium includes a digital signature to preclude the forgery of indicia by unauthorized parties. The postal security device is a unique security device that provides a cryptographic digital signature to the indicum and performs the function of postage meter registers.

There are approximately one and a half million postage meters in use in the United States accounting for about twenty billion dollars of postage revenue annually. The United States Postal Service (USPS) is authorized to regulate the manufacture and use of postage meters. For the past several years the United States Postal Service has been actively proposing a solution to the problem of inadequate postage meter security. The United States Postal Service is also trying to solve the problem that currently available postal meter indicia are susceptible to counterfeiting. The United States Postal Service plans to solve the above problems by decertifying mechanical meters and implementing the Information-Based Indicia Program (IBIP).

The IBIP is a United States Postal Service initiative supporting the development and implementation of a new form of postal indicia. The IBIP specification is intended to address the counterfeiting threat. An IBIP indicium substitutes for a postage stamp or as a postage meter imprint as evidence of the fact that postage has been paid on mail pieces. The Information-Based Indicia technology of the United States Postal Service offers the postal customer a way to pay for postage without stamps. Envelopes may be franked using the postal customer's personal computer, a personal computer compatible add on and the customer's printer. The PSD provides postal value storage and the link to the USPS and the manufacturer of the personal computer compatible add on.

The IBI should be able to be read at any time to verify that funds have been paid. It is expected that it will be difficult to produce an IBI that can be scanned and read while meeting the USPS requirements of reliability and security.

SUMMARY OF THE INVENTION

This invention overcomes the disadvantages of the prior art by providing a system that scans and reads IBI in accordance with the USPS Specification. This invention also improves both the readability and security of the IBI. The apparatus of this invention utilizes a postage meter that prints an IBI, scans and checks the IBI and prints an invisible, secure message, i.e., bar code over the IBI. The apparatus may also audit the franking process by immediately scanning and verifying the bar code that was printed over the IBI.

The use of an invisible ink to print a bar code "over, or as a part of the IBI" creates additional security. Since, the information represented by the invisible ink can not be photocopied by standard photocopiers and the information represented by the invisible ink may not be printed by standard ink jet printers.

The apparatus of this invention utilizes a postage meter to print an indicia. Said indicia may consist only of machine readable information or human readable and machine readable information. The machine readable information may be in plain text or encrypted and consists of visible and/or invisible bar coded information, which may represent piece count, register values, postage paid, time stamp, identification number and other forensic data. A scanner is contained within the postage meter to scan the visible indicia, i.e., IBI immediately after the IBI is printed. The scanned IBI is then decoded and the digital signature contained within the bar code is verified to ascertain that it has been printed properly. This scanning also serves as a readability check for the bar code to verify that the bar code meets the 99.9% readability standard specified by the USPS IBIP. The information from scanning of the bar code is then compared internally in the postage meter processing unit against the information that was intended to be printed. A record containing the information from the scanning as well as the original franking of the indicia is stored internally in the meter.

If, the scanned IBI is not the IBI that the meter intended to be printed, or if the IBI contains incorrect information, or if the IBI is fraudulent, then the meter will print additional material "over, or as part of the IBI". The additional material may be the word "void" and/or other coded material. The additional material may be printed with an ink that is visible or invisible to the human eye. The material that was printed with an invisible ink will be scanned by a second scanner to insure that the scanned material is correct. The additional printed material will alert the post office that something is wrong with the mail piece or IBI.

If, the scanned IBI is the IBI that the meter intended to be printed, then the meter will print additional material "over, or as part of the IBI". The additional material may be a bar code that is printed with an ink that is invisible to the human eye. The material that was printed with an invisible ink will be scanned by a second scanner to insure that the material printed with the invisible ink is correct.

DETAILED DESCRIPTION OF THE PREFERRED EMBODIMENT

Figure 1:
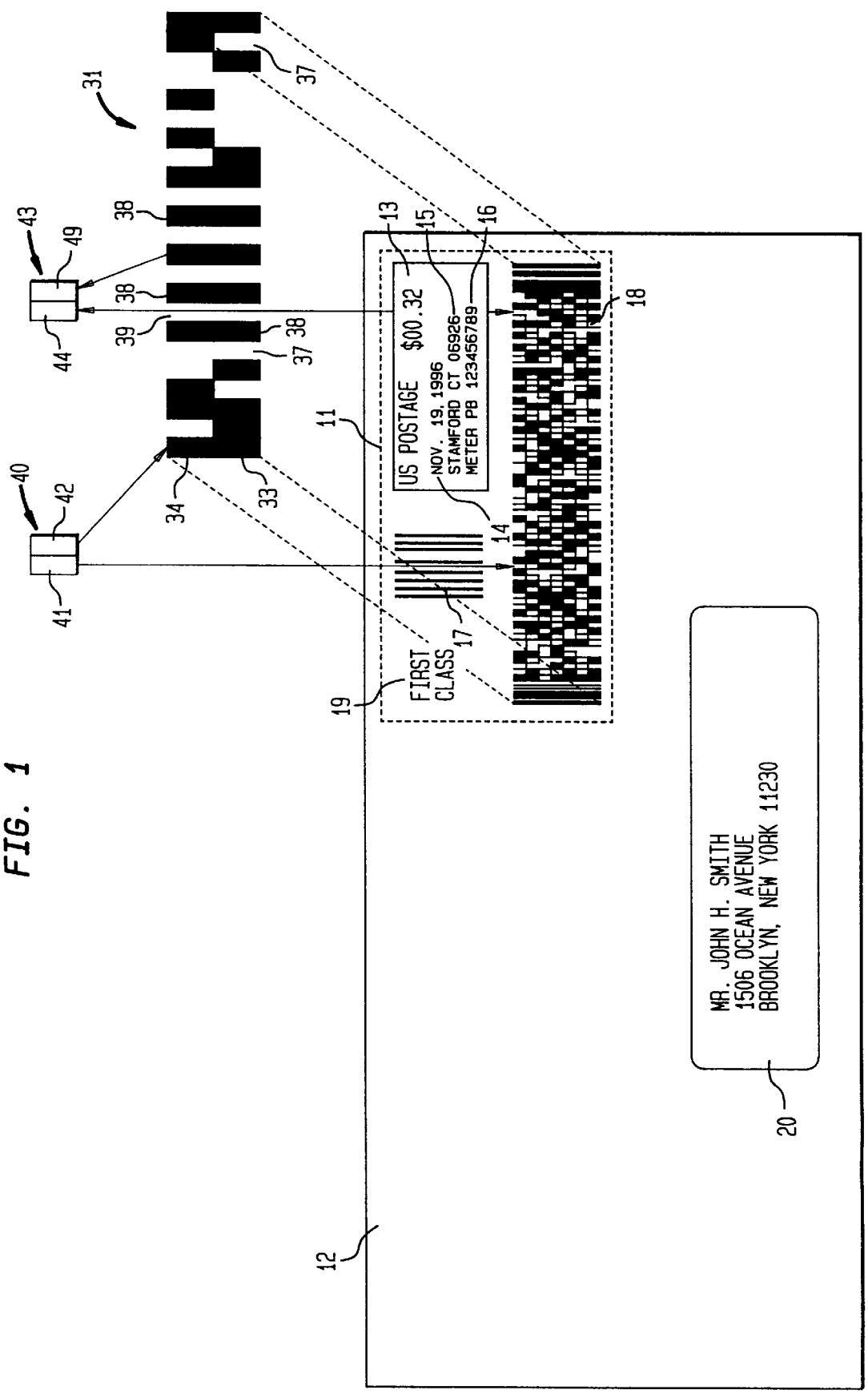
FIG. 1 is a drawing of a bar code printed on top of a mail piece containing a Information-Based Indicia.

Referring now to the drawings in detail, and more particularly to FIG. 1, the reference character 11 represents a USPS Information-Based Indicia that was printed on mail piece 12 by a printer (not shown). The postal indicia 11 contains a dollar amount 13, the date 14 that the postal indicia was affixed to the mail piece, the place the mail piece was mailed from 15, the postal meter serial number 16, a FIM code 17 and a 2D encrypted bar code 18. Mail piece 12 also contains an indication 19 of the class of mail piece 12. Mail piece 12 is going to be sent to the person and place indicated in address field 20.

An upper layer bar code 31 is printed over lower layer. It will be obvious to one skilled in the art that bar code 31 may contain additional information that increases the security of Information-Based Indicia 11 and/or contains information that the postage meter manufacture and/or post would like to know, i.e., does the postage meter require maintenance, has the readability of Information-Based Indicia 11 been degraded, etc. Bar code 31 is printed with an invisible ink. Bar code 31 has a data tract 33 and a clock track 34. A dark bar 36 or space containing ink would indicate a binary one in the data track and an empty space 37 or space containing no ink would indicate a zero in the data track. A dark bar 38 or space containing ink would indicate a binary one in the clock track and an empty space or space containing no ink would indicate a binary zero in the clock track.

Thus, in the same amount of space on mail piece 12, that would be utilized by the prior art to print one bar code, this invention prints two or more bar codes. Hence, more than double the amount of information may be printed in the same space. It will be obvious to one skilled in the art that bar code 31 may be a two dimensional encrypted bar code.

The inks that are used to print Information-Based Indicia 11 and 31 may be applied using conventional printing methods i.e. ink jet, dot matrix, impact, etc. The inks used to print Information-Based Indicia 11 and bar code 31 are similar and may have similar reflection wavelengths to the emission wavelength of the ink used to print bar code 31. The ink that is used to print bar code 31 is invisible to the naked eye and can be excited by ultra violet light. Examples of the ink that is used to print bar code 31 is based on organic complexes of, rare earth elements ions (lanthanides), such as: europium, gadolinium and terbium dipicolinates. An example of an ink that is used to print bar code 31 is set forth in the Auslander et al. U.S. Pat. No. 5,542,971 entitled "Bar Codes Using Luminescent Invisible Inks", dated Aug. 6, 1996, herein incorporated by reference.

The UV fluorescent pigment was chosen such that the emission wavelength is the same or close to the color of the visible printing so that the same detector systems can be used to detect the visible and invisible printings. An additional practical feature of the fluorescent emission of the invisible ink is selected such that it is at least 50 nm longer than the ½ width wavelength of the fluorescent brightners used in envelope paper stock. This enables discrimination of the bar code signal from the envelope background. The invisible bar code 31 gives improved signal to noise and readability over conventional visible bar codes due to the optical characteristics of emitted light over reflected light. It will be obvious to one skilled in the art that bar code 31 may be a 1d bar code, another type of bar code or another code. The signal from a conventional visible bar code is subject to degradation due to irregularity in the paper surface topography from the paper itself as well as the contents of an envelope.

The ink that is used to print Information-Based Indicia 11 and address field 20 is a conventional ink which absorbs in the visible range of the spectrum between (400–700 nm) and has a print contrast signal with a back ground of more than 0.4. An example of the above ink is an black ink that is currently being used in an ink jet printer, i.e., the desk jet printer manufactured by Hewlett Packard.

The information contained in Information-Based Indicia 11, address field 20 and bar code 31 may be read Within the postage meter by utilizing light sources 40. Light source 40 comprises: light sources 41 and 42. Light sources 41 and 42 have different wavelengths. Source 41 is utilized to illuminated Information-Based Indicia 11, address field 20 and source 42 is used to excite bar code 31. Source 41 is a lamp emitting light having a wavelength between 400 and 700 nm and source 42 is a ultraviolet source that emits light between 200–400 nm. Scanner 43 comprises a scanner 44 and a scanner 45. Scanner 44 is utilized to sense Information-Based Indicia 11 and address field 20 and scanner 45 is utilized to sense bar code 31.

Scanner 44 senses the reflected light from Information-Based Indicia 11 and scanner 45 senses the emitted light from bar code 31. Scanner 45 may be a photo diode or photo transistor.

Figure 2:
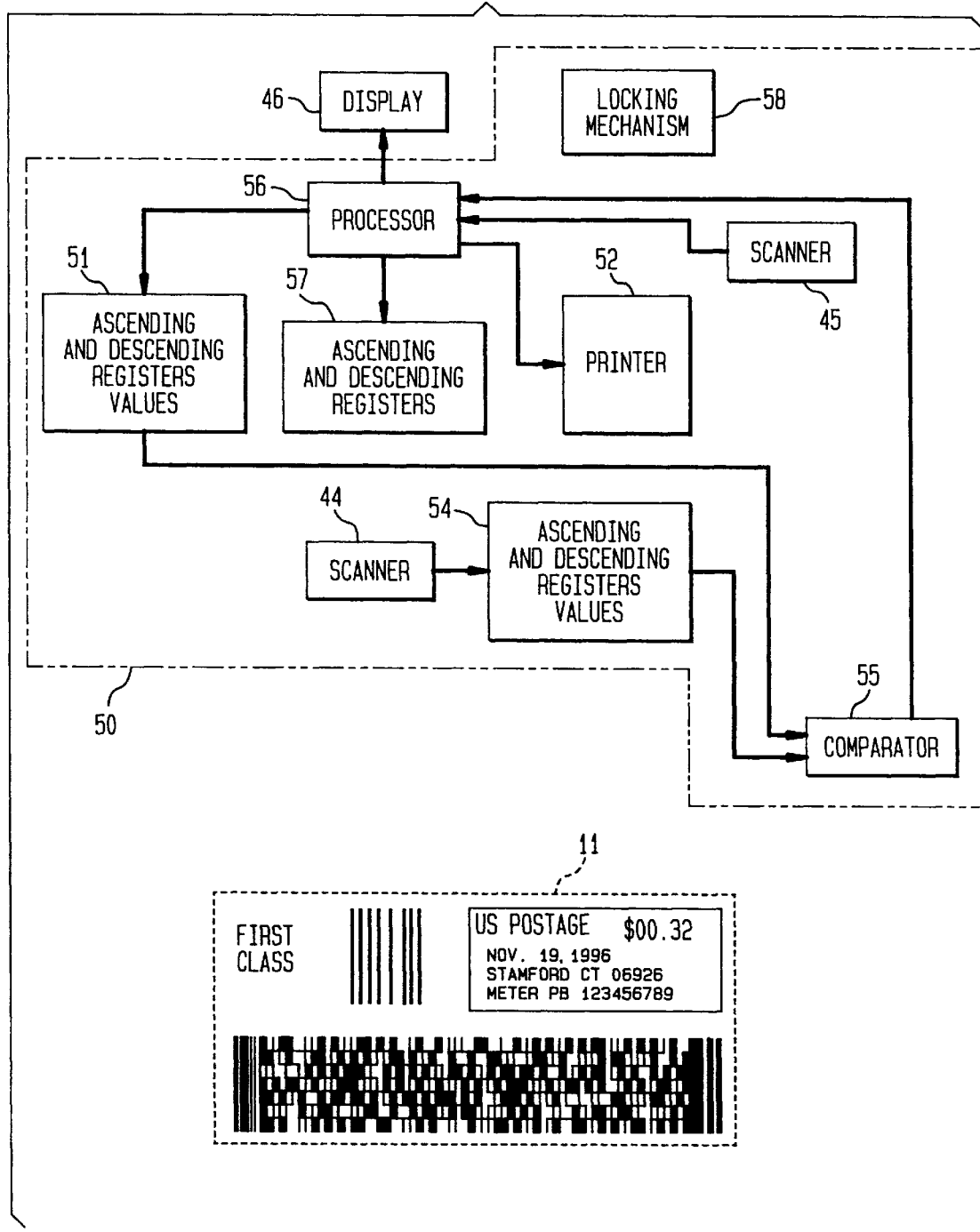
FIG. 2 is a drawing of a scanner contained within a postage meter that reads Information-Based Indicia 11 before bar code 31 (shown in FIG. 1) is printed over Information-Based Indicia 11 and a scanner that reads bar code 31.

FIG. 2 is a drawing of scanner 44 contained within a postage meter 50 that reads Information-Based Indicia 11 before bar code 31 (shown in FIG. 1) is printed over Information-Based Indicia 11 and scanner 45 that reads bar code 31. Postage meter 50 includes: a ascending register and a descending register 57; a printer 52, that prints bar code 11; a processor 56, a scanner 44; a ascending and descending register values 51; a ascending and descending register values 54, a comparator 55; a locking mechanism 58, and a scanner 45. A display 46 is connected to processor 56. As is known in the art the ascending register 57 maintains a record of all the postage dispensed by the postage meter 50 and the descending register 57 maintains a record of the amount of postage that has been purchased by the owner of meter 50. Locking mechanism 58 is used to prevent fraud by preventing the functioning of various meter 50 components when certain events happen, i.e., an unauthorized person attempts to access registers 57, etc.

Scanner 44 scans the information contained in Information-Based Indicia 11. Scanner 44 retrieves information from Information-Based Indicia 11 to ascertain whether or not Information-Based Indicia 11 has been correctly printed and is machine readable. The information contained in Information-Based Indicia 11 is decoded to retrieve a record of the information contained in ascending and descending register 51, the time, date, sequence of printing Information-Based Indicia 11, and other information contained in Information-Based Indicia 11 is sent to ascending and descending registers 54. The ascending and descending registers values 54 are transmitted to comparator 55. The output of ascending and descending register values 51 is coupled to comparator 55.

If, the information transmitted from register values 51 to comparator 55 is the same as the information transmitted by register values 54 to comparator 55 and scanner 44 can read Information-Based Indicia 11, printer 52 will print information in an invisible ink over Information-Based Indicia 11. The information printed by printer 52 may be in the form of a validation bar code, i.e., bar code 31. Bar code 31 is scanned by scanner 45 (FIG. 1) to determine whether or not bar code 31 i.e. readable. Information-Based Indicia 11 and bar code 31 may be read at the post office.

Figure 3:
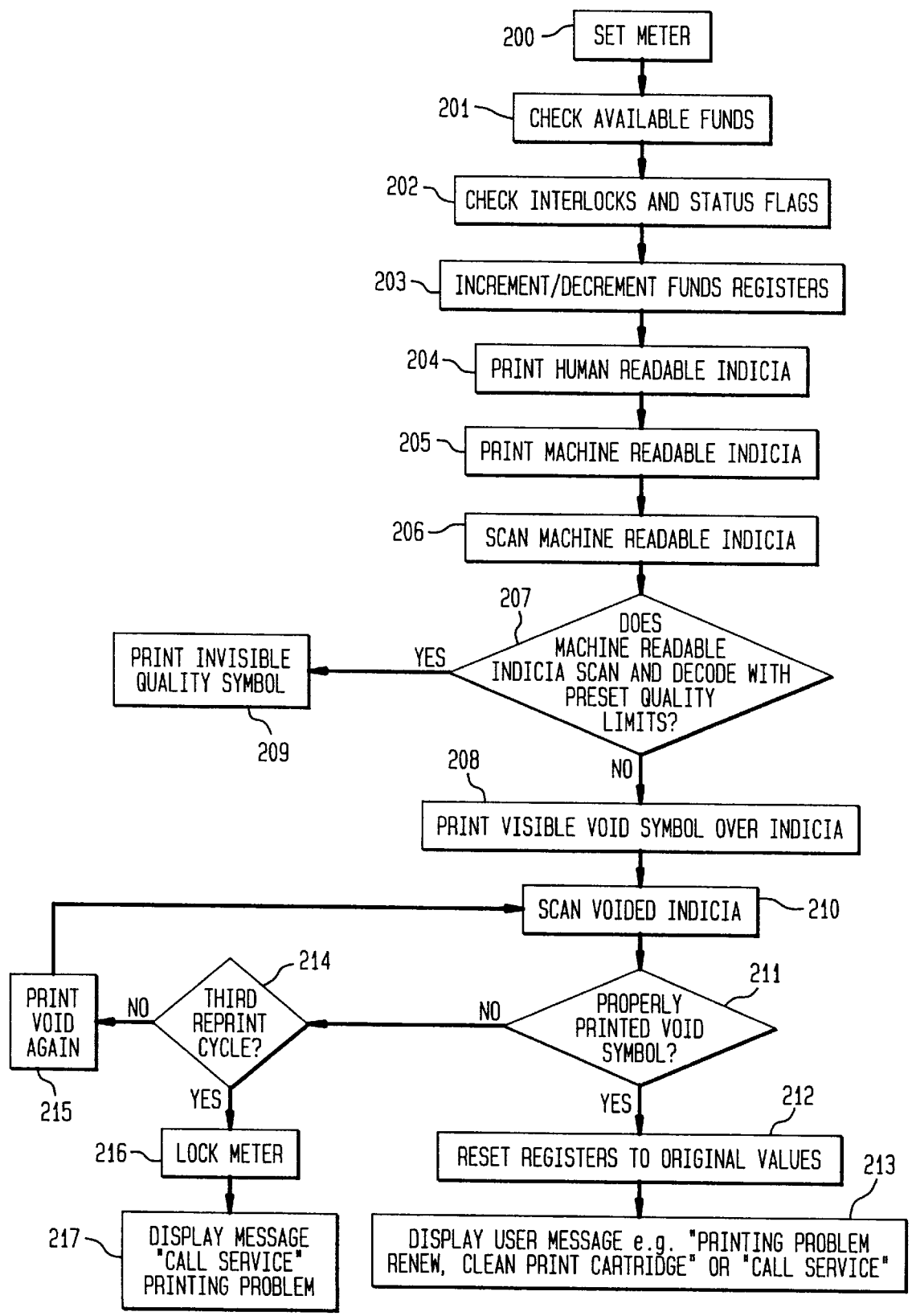
FIG. 3 is a drawing of a flow chart of the program contained within processor 56.

If, the information transmitted from registers 51 to comparator 55 is not the same as the information transmitted by registers 54 to comparator 55 or scanner 44 can not read Information-Based Indicia 11, an error signal is generated by comparator 55. Comparator 55 is coupled to processor 56. Comparator 55 resets ascending and descending registers 51 and causes printer 52 to print a valid message on mail piece 12. Printer 52 will print information in an invisible ink over Information-Based Indicia 11 indicating that there is something wrong with Information-Based Indicia 11. The information printed by printer 52 may be the word void or the word void may be coded in bar code 31 before mail piece 12 will be released by postage meter 50. Locking mechanism 58 is provided to lockout the operation of meter 50 if tampering of meter 50 is detected, or the program described in FIG. 3 is in the third reprint cycle. An example of a locking mechanism is set forth in the Taylor et al. U.S. Pat. No. 4,812,994 entitled "Postage Meter Locking System", dated Mar. 14, 1989, herein incorporated by reference. Display 46 is used to indicate the settings of meter 50 and status to a user, and to guide the user through the franking and meter refill processes.

FIG. 3 is a drawing of a flow chart of the program contained within processor 56. The program begins in block 200 where postage meter 50 (FIG. 2) is set. In block 201 the available funds in meter 50 are checked. Then the program checks the interlocks and status flags in block 202. Now, the program goes to block 203 to increment/decrement the funds registers of meter 50. At this point the program goes to block 204 to cause meter 50 to print indicia 11. Then the program goes to block 205 to command printer 52 to print Information-Based Indicia 11. Next, the program precedes to block 206 to command scanner 44 to scan address field 20 and Information-Based Indicia 11 of mail piece 12.

At this point the program goes to decision block 207 to determine whether or not Information-Based Indicia 11 has the same information that is contained in address field 20 and contains the preset quality limits. If, decision block 207 determines that indicia 11 does have the same information that is contained in address field 20 and does contain the preset quality limits, then the program precedes to block 209 to print invisible bar code 31. If, decision block 207 determines that indicia 11 does not have the same information that is contained in address field 20 and does not contain the preset quality limits, then the program precedes to block 208 to print the word "void" in human readable form over indicia 11. Then, the program goes to block 210 to scan the voided indicia. Now the program goes to decision block 211 to determine whether or not the void symbol was printed properly.

If, decision block 211 determines that the void symbol was printed properly, the program will go to block 212 to reset the funds registers to their original value. Then, the program will go to block 213 to inform the operator of meter 50 that some problem exists with meter 50, i.e., there is a printing problem, clean the print cartridge, replace the print cartridge, call service, etc. If, decision block 211 determines that the void symbol was printed improperly, the program will go to block 214 to determine whether or not this is the third reprint cycle. If, block 214 determines that it is not the third reprint cycle the program will go to block 215 to print another void symbol on indicia 11. Then the program will go back to block 210. If, block 214 determines that it is the third reprint cycle the program will go to block 216 to lock meter 50 so that it can not print additional postage. Then the program will go to block 217 to inform the user of meter 50 to call service because a printing problem exists.

The above specification describes a new and improved system for improving the readability and security of machine readable indicias. It is realized that the above description may indicate to those skilled in the art additional ways in which the principles of this invention may be used without departing from the spirit. It is, therefore, intended that this invention be limited only by the scope of the appended claims.

What is claimed is:

1. An improved metering system that affixes an Information-Based Indicia containing a digital signature to a mail piece, the improvement comprising:
   means for scanning the Indicia;
   means for decoding the digital signature contained within the Indicia to ascertain that the Indicia has been printed properly; and
   means for recording over the Indicia or in the vicinity of the Indicia additional information that is invisible to the human eye;
   means for preventing the printing of postage when the indicia is printed improperly.

2. The system claimed in claim 1, wherein the additional information is in the form of a bar code.

3. The system claimed in claim 1, wherein the additional information is in the form of an encrypted bar code.

4. The system claimed in claim 1, wherein the additional information is used to increase the security of the Information-Based Indicia.

5. The system claimed in claim 1, wherein the additional information contains information pertaining to the metering system that affixed the Information-Based Indicia.

6. The system claimed in claim 1, further including means for informing the user of problems that exist with the metering system.

7. The system claimed in claim 1, further including
   means coupled to the scanning means for comparing in a processing unit contained in the metering system having information stored about the Indicia affixed to the mail piece to the information scanned about the Indicia affixed to the mail piece.

8. The system claimed in claim 7, further including:
   means coupled to the scanning means for storing in the metering system the information scanned about the Indicia affixed to the mail piece.

9. The system claimed in claim 1, further including:
   means for reading the additional information recorded or the Indicia to determine if the additional information was recorded properly.

* * * * *